(12) United States Patent
Kuroda et al.

(10) Patent No.: US 9,356,469 B2
(45) Date of Patent: May 31, 2016

(54) STORAGE BATTERY DEVICE AND STORAGE BATTERY SYSTEM

(71) Applicant: Kabushiki Kaisha Toshiba, Tokyo (JP)

(72) Inventors: Kazuto Kuroda, Tokyo (JP); Shinichiro Kosugi, Yokohama (JP); Ryo Okabe, Fuchu (JP); Manabu Murakami, Kashiwazaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 127 days.

(21) Appl. No.: 14/161,273

(22) Filed: Jan. 22, 2014

(65) Prior Publication Data
US 2014/0203765 A1 Jul. 24, 2014

(30) Foreign Application Priority Data

Jan. 22, 2013 (JP) ................................. 2013-009529

(51) Int. Cl.
*H02J 7/00* (2006.01)
*H02J 9/00* (2006.01)
(52) U.S. Cl.
CPC ................. *H02J 9/00* (2013.01); *H02J 7/0031* (2013.01); *H02J 2007/0039* (2013.01)
(58) Field of Classification Search
CPC .................................................... H02J 7/0026
USPC .......................................................... 320/107
See application file for complete search history.

(56) References Cited

U.S. PATENT DOCUMENTS

| 5,825,155 | A | * | 10/1998 | Ito et al. | 320/118 |
| 5,955,869 | A | * | 9/1999 | Rathmann | 320/132 |
| 6,025,695 | A | * | 2/2000 | Friel et al. | 320/106 |
| 6,060,864 | A | * | 5/2000 | Ito et al. | 320/136 |
| 6,459,243 | B1 | * | 10/2002 | Cheiky et al. | 320/155 |
| 8,060,864 | B1 | * | 11/2011 | Michelsen | 717/126 |
| 2008/0084185 | A1 | * | 4/2008 | Nakazawa | 320/128 |
| 2010/0321025 | A1 | * | 12/2010 | Lin et al. | 324/427 |
| 2011/0074354 | A1 | * | 3/2011 | Yano | 320/116 |
| 2013/0110430 | A1 | * | 5/2013 | Nishi et al. | 702/63 |
| 2013/0187466 | A1 | * | 7/2013 | Sakai et al. | 307/52 |

FOREIGN PATENT DOCUMENTS

JP 2007-236017 A 9/2007

* cited by examiner

*Primary Examiner* — Suchin Parihar
(74) *Attorney, Agent, or Firm* — Baker Botts L.L.P.

(57) ABSTRACT

According to one embodiment, a storage battery device includes a battery unit, a charging unit, a terminal, and a first circuit breaking unit. The battery unit includes a lithium ion battery and is connectable in parallel to other storage battery device that charges an external lithium ion battery. The charging unit is supplied with electric power from an external electric power source and charges the battery unit. The terminal is connectable to a wire connecting the other storage battery device with the battery unit. The first circuit breaking unit is connected between the battery unit and the terminal, and blocks an electric current flowing from the terminal to the battery unit.

5 Claims, 1 Drawing Sheet

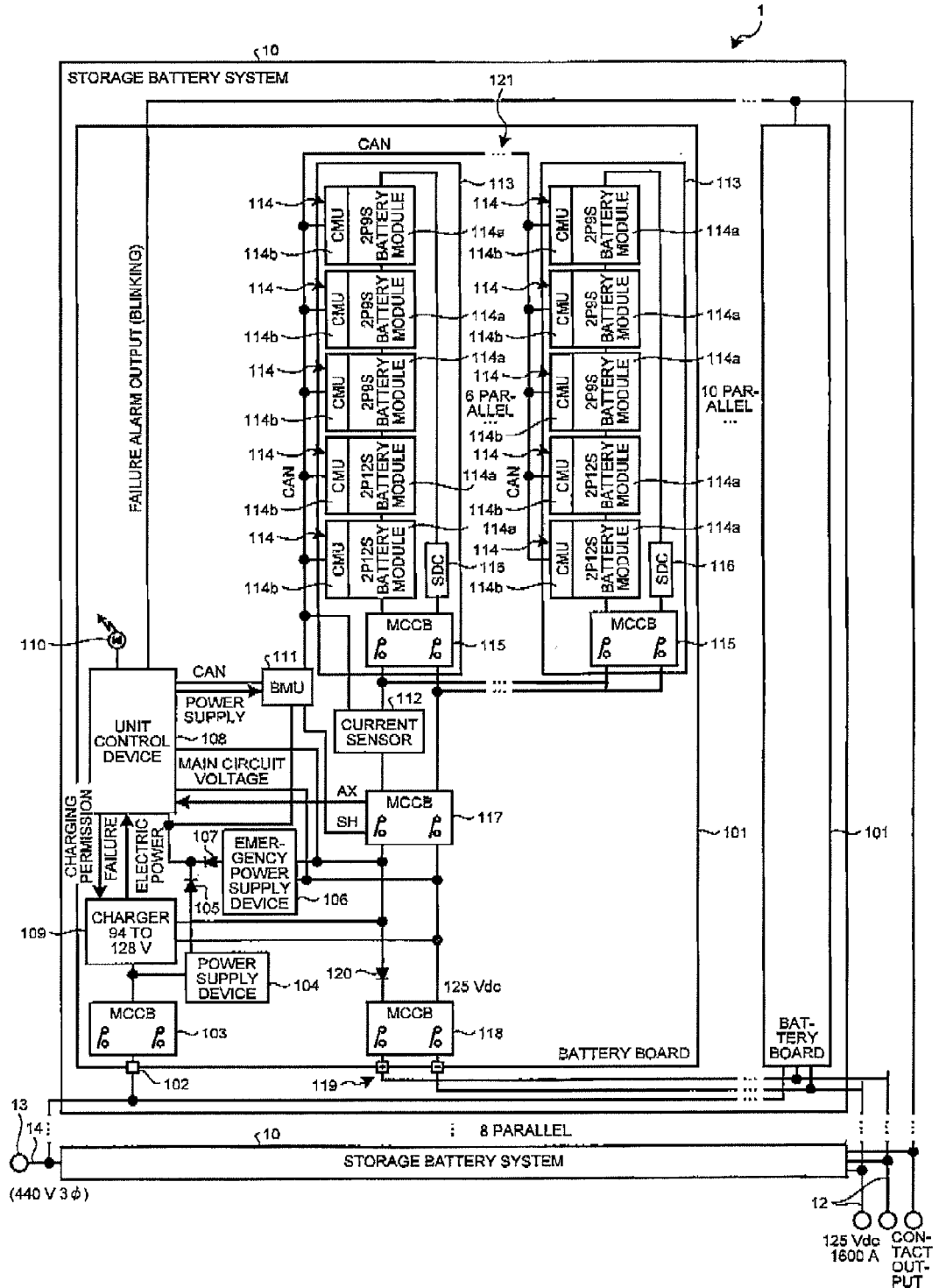

STORAGE BATTERY DEVICE AND STORAGE BATTERY SYSTEM

CROSS-REFERENCE TO RELATED APPLICATIONS

This application is based upon and claims the benefit of priority from Japanese Patent Application No. 2013-009529, filed Jan. 22, 2013, the entire contents of which are incorporated herein by reference.

FIELD

Embodiments described herein relate generally to a storage battery device and a storage battery system.

BACKGROUND

For example, due to a drop in cost of lithium ion batteries having high energy density and situations in which a back-up time has to be secured by an emergency storage battery system at the time of wide-scale disasters, there has been increasing social demands for addition or replacement of a storage battery system using a lithium ion battery in an existing emergency storage battery system based on a lead storage battery. From such a background, there has been proposed a technique of using a lithium ion battery in an emergency storage battery system have been proposed.

However, in the conventional technology, when charging is performed in an emergency battery system in which storage battery devices each of which includes a lithium ion battery are connected in parallel, the lithium ion battery is exclusively charged for each storage battery device by a single charging device installed outside the storage battery device. For this reason, in the emergency storage battery system in which a large number of storage battery devices are connected in parallel, there is a problem in that a time necessary for charging is taken long. Further, when there is a potential difference between the storage battery devices, an electric current flows from a storage battery device of a charging target to another storage battery device, and so the other storage battery device is charged. Thus, there is a problem in that it takes a long time to charge the storage battery device of the charging target.

BRIEF DESCRIPTION OF THE DRAWING

FIG. 1 is a block diagram illustrating a configuration of an electrical system of an emergency storage battery system according to the present embodiment.

DETAILED DESCRIPTION

In general, according to one embodiment, a storage battery device comprises a battery unit, a charging unit, a terminal, and first circuit breaking unit. The battery unit includes a lithium ion battery and is connectable in parallel to other storage battery device that charges an external lithium ion battery. The charging unit is supplied with electric power from an external electric power source and charges the battery unit. The terminal is connectable to a wire connecting the other storage battery device with the battery unit. The first circuit breaking unit is connected between the battery unit and the terminal, and blocks an electric current flowing from the terminal to the battery unit.

FIG. 1 is a block diagram illustrating a configuration of an electrical system of an emergency storage battery system according to the present embodiment. An emergency storage battery system 1 functions as an emergency power source that supplies electric power to an external load when supply of electric power from an external regular direct current (DC) power source to an external load (for example, large-scale facilities such as power plants or factories) is blocked.

In the present embodiment, the emergency storage battery system 1 is configured such that eight storage battery systems 10 capable of supplying DC power of 125 V and 200 Ah are connected in parallel via a bus 12 that is a wire through which electric power is supplied from an external regular DC power source to an external load. Thus, in the present embodiment, the emergency storage battery system 1 can supply DC power of 125 V and 1600 A to an external load. Each of the storage battery systems 10 of the emergency storage battery system 1 is supplied with alternating current (AC) power of 440 V supplied from an external commercial power source via a wire 14 disposed separately from the bus 12 through an external power supply terminal 13.

Each of the storage battery systems 10 installed in the emergency storage battery system 1 includes a battery board 101 (an example of a storage battery device) that is connectable in parallel to other battery boards 101 (an example of other storage battery devices), each of which includes a lithium ion battery and charges the lithium ion battery. In the present embodiment, the storage battery system 10 is connected in parallel to ten battery boards 101. In the present embodiment, since the emergency storage battery system 1 includes the eight storage battery systems 10 as described above, the eighty battery boards 101 are connected in parallel.

The battery board 101 includes a power supply terminal 102, overcurrent protection molded case circuit breakers (MCCBs) 103, 117, and 118, a power supply device 104, reverse current prevention diodes 105, 107, and 120, an emergency power supply device 106, a unit control device 108, a charger 109, a failure display unit 110, a battery management unit (BMU) 111, a current sensor 112, an emergency power supply terminal 119, and a battery unit 121.

The battery unit 121 includes a plurality of assembled battery modules 113 (six assembled battery modules 113 in the present embodiment) that are connected in parallel. The battery unit 121 is connectable in parallel to other battery boards 101. In the present embodiment, the assembled battery module 113 includes five battery modules 114 that are connected in series, a maintenance MCCB 115, and a service disconnector (SDC) 116.

The battery module 114 includes a lithium ion battery 114a and a cell monitoring unit (CMU) 114b.

In the present embodiment, in the assembled battery module 113, among the five battery modules 114 that are connected in series, the two battery modules 114 include a 2 parallel 12 series (2P12S) lithium ion battery (20 Ah-2.4 V) 114a, and the remaining three battery modules 114 include a 2 parallel 9 series (2P9S) lithium ion battery (20 Ah-2.4 V) 114a. Through this configuration, in the battery board 101 according to the present embodiment, the battery unit 121 is configured to include the lithium ion batteries 114a that are connected in series and are equal in number to a number corresponding to a value (for example, 51) obtained by dividing a predetermined target battery voltage (for example, 125 V) by a cell voltage (for example, 2.4 V) of the lithium ion battery 114a. Here, the target battery voltage refers to a voltage necessary to drive an external load that is supplied with electric power from the emergency storage battery system 1 when supply of electric power from an external regular DC power source to an external load is blocked.

Thus, for example, when the target battery voltage is 48 V, the assembled battery module 113 is configured to include one battery module 114 including the 2 parallel 12 series lithium ion battery 114a and one battery module 114 including the 2 parallel 9 series lithium ion battery 114a. Through this configuration, the battery unit 121 is configured to include the lithium ion batteries 114a that are connected in series and equal to a number (for example, 21) corresponding to a value obtained by dividing the target battery voltage (for example, 48 V) by a cell voltage (for example, 2.4 V) of the lithium ion battery 114a.

Meanwhile, in the assembled battery module 113 including a plurality of battery modules 114 that are connected in series, when an internal short circuit occurs in the battery module 114, an electric current flows in from an adjacent battery module 114, and thus other battery modules 114 are likely to be broken. Further, for example, although an internal short circuit occurs in the battery module 114 while the battery board 101 is being conveyed, it is difficult to operate a function of blocking an overcurrent generated by the internal short circuit since the BMU 111 or the unit control device 108 which will be described later is not supplied with electric power and is in an off state.

However, since the battery module 114 of the present embodiment is configured such that a plurality of lithium ion batteries 114a are connected in series, even if an internal short circuit occurs in any lithium ion battery 114a, an overcurrent generated by the internal short circuit has a value obtained by dividing electromotive force of the corresponding lithium ion battery 114a by resistance values of an internal resistors of the plurality of lithium ion batteries 114a that are connected in series. Thus, the overcurrent generated by the internal short circuit in the lithium ion battery 114a is suppressed to a permissible current or less that does not damage the battery module 114, and a function of blocking an overcurrent need not be provided.

The CMU 114b detects the cell voltage and the temperature of the lithium ion battery 114a disposed in the battery module 114. The CMU 114b notifies the BMU 111 of the detected cell voltage and the temperature through controller area network (CAN) communication. Further, the CMU 114b receives an instruction from the BMU 111, and performs cell balancing of averaging the cell voltage of the lithium ion battery 114a disposed in the battery module 114.

The maintenance MCCB 115 is disposed for each assembled battery module 113, enters an off state at the time of the maintenance of the assembled battery module 113 (for example, at the time of the replacement of the battery module 114 having a failure among the battery modules 114 disposed in the assembled battery module 113), and blocks an electric current flowing to the assembled battery module 113 or an electric current flowing in from the assembled battery module 113. Through this operation, the operator can safely do the maintenance on the assembled battery module 113.

The SDC 116 is a disconnector for maintenance. When the maintenance on the battery module 114 is performed, the operator operates the SDC 116 to disconnect a connection between the battery modules 114 and secures safety at the time of maintenance.

The power supply terminal 102 is a terminal that is supplied with electric power from an external commercial power source through the external power supply terminal 13.

The overcurrent protection MCCB 103 blocks an overcurrent flowing from the external commercial power source to the battery board 101 through the external power supply terminal 13. In the present embodiment, the overcurrent protection MCCB 103 is used as a circuit breaking unit that blocks the overcurrent flowing from the external commercial power source to the battery board 101, but the circuit breaking unit is not limited to this example. A fuse element or the like may be used as the circuit breaking unit, and the overcurrent flowing in from the external commercial power source may be blocked by fusing the fuse element by the overcurrent from the external commercial power source.

The charger 109 is supplied with electric power from the external commercial power source through the external power supply terminal 13 and charges the battery unit 121. In the present embodiment, when the unit control device 108 allows charging, the charger 109 is supplied with electric power from the external commercial power source (not illustrated) and charges the battery unit 121.

In the present embodiment, the battery unit 121 is not charged through an external charging device disposed outside the battery board 101 via the bus 12. Instead, by charging the battery unit 121 through the charger 109 disposed for each the battery board 101, a plurality of battery boards 101 can be charged in synchronization. Thus, charging can be performed in a shorter time than when the battery board 101 is exclusively charged through the external charging device disposed outside the battery board 101.

Further, even when the number of the battery boards 101 equipped in the storage battery system 10 increases, it is unnecessary to install a large-capacity external charging device capable of charging the battery units 121 of all the battery boards 101. Further, since high electric power is not supplied from the external charging device to the storage battery system 10 via the bus 12, it is unnecessary to increase the wire capacity of the bus 12.

Further, since the charger 109 is supplied with electric power from an external commercial power source separate from the external regular DC power source that supplies an external load with electric power and charges the battery unit 121, the capacity of the external regular DC power source is decided by power consumption of the external load and does not depend on the capacity of the storage battery system 10 side. Thus, when the battery board 101 is added to the storage battery system 10 and so the capacity of the storage battery system 10 increases, it is unnecessary to replace the external regular DC power source with a large-capacity one, and thus the battery board 101 can be easily added to the storage battery system 10.

Further, the charger 109 detects its failure, and notifies the unit control device 108 of the detection result.

The power supply device 104 is an AC-DC converter that converts electric power supplied from the external commercial power source through the external power supply terminal 13 into DC power and supplies the DC power to the unit control device 108.

The reverse current prevention diode 105 is a diode that prevents a reverse current flowing from the emergency power supply device 106 (which will be described later) to the power supply device 104.

When supply of electric power from the external commercial power source is blocked, the emergency power supply device 106 supplies electric power charged in the battery unit 121 to the unit control device 108.

The reverse current prevention diode 107 is a diode that prevents a reverse current flowing from the power supply device 104 to the emergency power supply device 106.

The current sensor 112 detects a current value of an electric current flowing to the battery board 101, and transmits the detection result of the current value to the BMU 111 through CAN communication.

When a charging voltage of the battery unit 121 becomes a maximum charging voltage causing an overcharge state or when a charging voltage of the battery unit 121 becomes a final discharging voltage causing an over discharge state, the BMU 111 controls the overcurrent protection MCCB 117 that the overcurrent protection MCCB 117 blocks an electric current flowing to the battery unit 121 when the battery unit 121 is charged or an electric current flowing in from the battery unit 121 when the battery unit 121 is discharged, so that the safety of the battery unit 121 is secured.

In the present embodiment, when a power supply instruction is given from the unit control device 108, the BMU 111 is supplied with electric power from the battery unit 121 and driven. Further, the BMU 111 acquires the cell voltage and the temperature detected by the CMU 114*b* through CAN communication. Further, the BMU 111 acquires a current value of an electric current flowing to the battery unit 121 that is detected by the current sensor 112 through CAN communication.

Then, the BMU 111 determines whether the charging voltage of the battery unit 121 becomes the maximum charging voltage or the final discharging voltage and so the battery unit 121 is in the state in which the safety of the battery unit 121 is not secured (the overcharge state or the over discharge state) based on the cell voltage and the temperature acquired from the CMU 114*b* and the current value acquired from the current sensor 112. Then, when the battery unit 121 is determined to be in the overcharge state or the over discharge state, the BMU 111 outputs a trip signal to the overcurrent protection MCCB 117 to turn off the overcurrent protection MCCB 117, and thus blocks an overcurrent flowing from the battery unit 121.

Further, the BMU 111 transmits the cell voltage and the temperature detected by the CMU 114*b* and the current value detected by the current sensor 112 to the unit control device 108 through CAN communication.

The overcurrent protection MCCB 117 is an example of a second circuit breaking unit that is connected in series to the battery unit 121 and blocks the overcurrent flowing in from the battery unit 121 when the battery unit 121 is in the overcharge state or the over discharge state. In the present embodiment, the overcurrent protection MCCB 117 enters the off state according to the trip signal (SH) which is input from the BMU 111 and used to instruct the battery unit 121 to prohibit charging and discharging, and blocks the overcurrent flowing in from the battery unit 121. Further, the overcurrent protection MCCB 117 outputs a state signal (AX) representing the on state or the off state of the overcurrent protection MCCB 117 to the unit control device 108.

In the present embodiment, the overcurrent protection MCCB 117 is used as an example of the circuit breaking unit that blocks the overcurrent flowing in from the battery unit 121, but the circuit breaking unit is not limited to this example. For example, a relay circuit or the like may be used as an example of the circuit breaking unit that blocks the overcurrent flowing in from the battery unit 121.

The unit control device 108 is supplied with electric power from the power supply device 104 or the emergency power supply device 106 and driven to control the respective components of the battery board 101. In the present embodiment, the unit control device 108 detects a voltage (hereinafter, referred to as a "main circuit voltage") of the battery unit 121. Further, the unit control device 108 controls charging of the battery unit 121 by the charger 109 based on the cell voltage, the temperature and the current value received from the BMU 111 through CAN communication and the detected main circuit voltage. In the present embodiment, the unit control device 108 and the charger 109 function as an example of a charging unit.

Further, when a failure is detected by the charger 109 or when the state signal (AX) received from the overcurrent protection MCCB 117 represents the off state (that is, when the battery unit 121 is in the overcharge state or the over discharge state), the unit control device 108 controls the failure display unit 110 which will be described later such that the failure display unit 110 displays a failure in the battery board 101.

The failure display unit 110 includes a light emitting diode (LED) and the like, and displays a failure (for example, a failure detected in the charger 109 or the occurrence of the overcharge state or the over discharge state of the battery unit 121) in the battery board 101.

The emergency power supply terminal 119 is a terminal connectable to the bus 12. In other words, the emergency power supply terminal 119 is a terminal connectable to the bus 12 through which other battery boards 101 are connected with the battery unit 121. When supply of electric power from the external regular DC power source to the external load is blocked, the battery board 101 supplies electric power from the battery unit 121 to the external load through the emergency power supply terminal 119.

The reverse current prevention diode 120 is an example of a circuit breaking unit that is connected between the battery unit 121 and the emergency power supply terminal 119 and blocks an electric current flowing from the emergency power supply terminal 119 to the battery unit 121. In the present embodiment, the reverse current prevention diode 120 is connected to a high potential side terminal of the emergency power supply terminal 119, and blocks an electric current flowing in from the other battery boards 101. Through this operation, when there is a potential difference between the battery boards 101, an electric current does not flow in from the other battery boards 101, and thus it is possible to prevent the battery unit 121 from being charged by the other battery boards 101.

The overcurrent protection MCCB 118 is connected between a circuit (for example, the unit control device 108 or the charger 109) equipped in the battery board 101 and the emergency power supply terminal 119, and blocks the overcurrent flowing to the emergency power supply terminal 119 due to a short circuit of a circuit in the battery board 101 or the like.

In the present embodiment, the overcurrent flowing from the circuit equipped in the battery board 101 to the emergency power supply terminal 119 is blocked by the overcurrent protection MCCB 118, but the present invention is not limited to this example. For example, a fuse element may be disposed between a circuit of the battery board 101 and the emergency power supply terminal 119, and the overcurrent flowing from the battery board 101 to the emergency power supply terminal 119 may be blocked by fusing the fuse element by the overcurrent flowing from the circuit of the battery board 101.

Next, the flow of an operation of the battery board 101 equipped in the storage battery system 10 of the emergency storage battery system 1 according to the present embodiment will be described. First of all, the description will proceed with an operation of the battery board 101 in a state in which electric power is being supplied from the external regular DC power source to the external load and electric power is being supplied from the external commercial power source to the storage battery system 10. When electric power is being supplied from the external commercial power source, the unit control device 108 is driven by electric power supplied from the power supply device 104, and allows the charger 109 to charge the battery unit 121.

In the present embodiment, the unit control device 108 causes the battery unit 121 to be charged by the charger 109 so that a discharge current value of a discharge current discharged from the battery unit 121 is a permissible output current value of the battery board 101 or less. In the present embodiment, the discharge current value of the battery unit 121 may be maintained to be the permissible output current value or less by deciding a discharge termination voltage Vl and a maximum charging voltage Vu of the battery unit 121 satisfying the following Formula (1):

$$I_p \geq \frac{V_u - V_l}{R_b} + I_r \quad (1)$$

Rb represents an equivalent resistance value of a main DC circuit (including the battery unit 121) of the battery board 101.

Ip represents the permissible output current value that is an upper limit of an electric current that can flow through the battery board 101. More specifically, Ip is a smallest current value among a current value by which a diode (for example, the reverse current prevention diode 120) equipped in the battery board 101 is broken, a current value by which the fuse element protecting the diode is fused, a current value that is blocked by various kinds of MCCBs (for example, the overcurrent protection MCCB 117 and the overcurrent protection MCCB 118), and a current value by which the battery module 114 generates heat by discharging.

Ir is a value (20 A in the present embodiment) obtained by dividing a rated output current value (1600 A in the present embodiment) flowing from the emergency storage battery system 1 to the external load by the number of the battery boards 101.

In Formula (1), Ip and Ir have the same value in the respective battery boards 101. Thus, in Formula (1), a term {(Vu−Vl)/Rb} representing a consumption current in the battery unit 121 has to be (Ip−Ir) or less, and thus the range in which the discharge termination voltage Vl and the maximum charging voltage Vu vary is confined. As a result, a difference in a charging rate of the battery unit 121 between the battery boards 101 does not increase, and thus it is possible to prevent the battery board 101 having the battery unit 121 having a high charging rate from being concentratedly discharged.

Further, when the discharge termination voltage Vl and the maximum charging voltage Vu are decided to satisfy Formula (1), a current value of an electric current flowing through the battery board 101 does not exceed Ip, and thus it is unnecessary to install a device (for example, a resistor) limiting an electric current in the battery board 101.

The battery unit 121 equipped in the battery board 101 is hardly discharged unless supply of electric power from the external regular DC power source to the external load is blocked but discharged for each the battery board 101 due to consumption of electric power by the BMU 111, cell balancing by the CMU 114b, self-discharging of the battery unit 121, or the like. For this reason, when the chargers 109 equipped in the respective battery boards 101 independently perform charging (that is, when the start and the end of charging by the chargers 109 equipped in the respective battery boards 101 are not synchronized), the charging rates of the battery units 121 in the respective battery boards 101 are different, and thus when electric power starts to be supplied to the external load, the battery board 101 equipped with the battery unit 121 having a high charging rate is considered to be concentratedly discharged.

In this regard, in the present embodiment, as described above, as the unit control device 108 charges the battery unit 121 so that the discharge current value of the battery unit 121 is the permissible output current value or less, the difference in the charging rate of the battery unit 121 between the battery boards 101 does not increase, and thus it is possible to prevent the battery board 101 of the battery unit 121 having a high charging rate from being concentratedly discharged.

Further, while the battery unit 121 is being charged by the unit control device 108 and the charger 109, the reverse current prevention diode 120 blocks an electric current flowing from the emergency power supply terminal 119 connected to another battery board 101 into the battery unit 121. Through this operation, when there is a potential difference between the battery boards 101, a phenomenon that an electric current flows from the battery board 101 to another battery board 101 and so the battery unit 121 of the other battery board 101 is charged or a phenomenon that an electric current flows from another battery board 101 to its own battery board 101 and so the battery unit 121 of its own battery board 101 is charged does not occur, and thus it is possible to reduce a charging time of the battery unit 121 disposed in the battery board 101.

Further, while the battery unit 121 is being charged by the unit control device 108 and the charger 109, the BMU 111 acquires the cell voltage and the temperature from the CMU 114b, and acquires the current value from the current sensor 112 through CAN communication. Further, when it is determined that the battery unit 121 has entered the overcharge state, that is, the state in which the safety of the battery unit 121 is not secured based on the acquired cell voltage and the temperature and the current value acquired from the current sensor 112, the BMU 111 outputs the trip signal to the overcurrent protection MCCB 117, causes the overcurrent protection MCCB 117 to enter the off state, and thus blocks the overcurrent flowing in from the battery unit 121. As a result, it is possible to prevent another overcurrent from flowing from the battery board 101 and damaging another battery board 101 due to the occurrence of the overcharge state of the battery unit 121.

When a failure is detected by the charger 109 or when the state signal (AX) representing the off state is received from the overcurrent protection MCCB 117, the unit control device 108 inhibits the charger 109 from charging the battery unit 121. Further, the unit control device 108 notifies of a failure in the battery board 101 by causing an LED equipped in the failure display unit 110 to blink. Through this operation, the operator can easily recognize the battery board 101 in which the failure has occurred.

Next, the description will proceed with an operation of the battery board 101 in the state in which supply of electric power from the external regular DC power source to the external load and supply of electric power from the external commercial power source to the storage battery system 10 are blocked. When supply of electric power from the external commercial power source is blocked, the unit control device 108 is driven by electric power supplied from the emergency power supply device 106, and instructs the charger 109 to inhibit the battery unit 121 from being charged. Then, the battery board 101 supplies electric power from the battery unit 121 to the external load through the emergency power supply terminal 119.

While electric power is being supplied from the battery unit 121 to the external load, the BMU 111 acquires the cell voltage and the temperature from the CMU 114b and acquires the current value from the current sensor 112 through CAN communication.

Further, when it is determined that the battery unit 121 has entered the over discharge state, that is, the state in which the safety of the battery unit 121 is not secured based on the acquired cell voltage and the temperature and the current value acquired from the current sensor 112, the BMU 111 outputs the trip signal to the overcurrent protection MCCB 117, causes the overcurrent protection MCCB 117 to enter the off state, and thus blocks the overcurrent flowing in from the battery unit 121. As a result, it is possible to prevent another overcurrent from flowing from the battery board 101 and damaging another battery board 101 due to the occurrence of the over discharge state of the battery unit 121.

Further, when a failure occurs in the battery board 101 and maintenance is performed on the assembled battery module 113 equipped in the battery board 101, the operator causes a maintenance MCCB 115f disposed in the assembled battery module 113 of the maintenance target to enter the off state, and thus blocks an electric current flowing to the assembled battery module 113 or an electric current flowing from the assembled battery module 113. Thus, it is possible to secure safety when maintenance is performed on the assembled battery module 113 or the assembled battery module 113 is assembled.

As described above, according to the battery board 101 of the present embodiment, provided is the reverse current prevention diode 120 that blocks an electric current flowing from the emergency power supply terminal 119 connectable to the bus 12 through which the battery boards 101 are connected in parallel into the battery unit 121. Thus, when there is a potential difference between the battery boards 101, a phenomenon that an electric current flows from the battery board 101 to another battery board 101 and so the battery unit 121 of the other battery board 101 is charged or a phenomenon that an electric current flows from another battery board 101 to its own battery board 101 and so the battery unit 121 of its own battery board 101 is charged does not occur, and thus it is possible to reduce a charging time of the battery unit 121 disposed in the battery board 101.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage battery device comprising:
a battery unit that includes a lithium ion battery and is connectable in parallel to other storage battery device that charges an external lithium ion battery;
a charging unit that is supplied with electric power from an external electric power source and charges the battery unit so that a current value of an electric current discharged from the battery unit is less than or equal to a permissible output current value of the storage battery device;
a terminal that is connectable to a wire connecting the other storage battery device with the battery unit; and
a first circuit breaking unit that is connected between the battery unit and the terminal, and blocks a charging electric current which is an electric current flowing from the terminal to the battery unit when there is a potential difference between the battery unit and the other storage battery device,
wherein a discharge terminal voltage $V_l$ and a maximum charging voltage $V_u$ of the battery unit satisfy a following Formula, the maximum charge voltage $V_u$ being a voltage at which a charging voltage of the battery unit becomes a maximum charging voltage causing an overcharge state, $$I_p \geq \frac{V_u - V_l}{R_b} + I_r$$

where $R_b$ represents an equivalent resistance of the battery unit, $I_p$ represents the permissible output current value that is an upper limit of an electric current that can flow through the storage battery device, and $I_r$ is a value obtained by dividing a rated output current value flowing from the storage battery device and the other storage battery device to an external load by the number of the storage battery device and the other storage battery device.

2. The storage battery device according to claim 1, further comprising a second circuit breaking unit that is connected in series to the battery unit and blocks an overcurrent flowing from the battery unit to the terminal.

3. The storage battery device according to claim 1, wherein the circuit breaking unit is a diode that blocks an electric current flowing from the terminal to the battery unit.

4. The storage battery device according to claim 1, wherein the battery unit includes a plurality of lithium ion batteries that are connected in series and are equal in number to a number corresponding to a value obtained by dividing a predetermined target battery voltage by a cell voltage of one lithium ion battery.

5. A storage battery system comprising:
a plurality of storage battery devices that are connected in parallel via a wire through which electric power is supplied to an external load, wherein
each of the storage battery devices comprises:
a battery unit that includes a lithium ion battery;
a charging unit that is supplied with electric power from an external electric power source and charges the battery unit so that a current value of an electric current discharged from the battery unit is less than or equal to a permissible output current value of the storage battery device;
a terminal that is connectable to the wire; and
a circuit breaking unit that is connected between the battery unit and the terminal, and blocks a charging electric current which is an electric current flowing from the terminal to the battery unit when there is a potential difference between the battery unit and the other storage battery device,
wherein a discharge terminal voltage $V_l$ and a maximum charging voltage $V_u$ of the battery unit satisfy a following Formula, the maximum charge voltage $V_u$ being a voltage at which a charging voltage of the battery unit becomes a maximum charging voltage causing an overcharge state, $$I_p \geq \frac{V_u - V_l}{R_b} + I_r$$

where $R_b$ represents an equivalent resistance of the battery unit, $I_p$ represents the permissible output current value that is an upper limit of an electric current that can flow through the storage battery device, and $I_r$ is a value obtained by dividing a rated output current value flowing from the storage battery device and the other storage battery device to an external load by the number of the storage battery device and the other storage battery device.

* * * * *